UNITED STATES PATENT OFFICE.

JOHANN BAMMANN, OF ELBERFELD, GERMANY, ASSIGNOR TO THE FARBENFABRIKEN OF ELBERFELD COMPANY, OF NEW YORK.

GREEN-BLUE TETRAZO DYE.

SPECIFICATION forming part of Letters Patent No. 611,597, dated October 4, 1898.

Application filed December 20, 1897. Serial No. 662,703. (Specimens.) Patented in France October 30, 1893, No. 233,732; in England October 31, 1893, No. 20,579, and in Italy December 31, 1893, XXVIII, 36,335, LXXI, 208.

*To all whom it may concern:*

Be it known that I, JOHANN BAMMANN, doctor of philosophy, chemist, (assignor to the FARBENFABRIKEN OF ELBERFELD COMPANY, of New York,) residing at Elberfeld, Germany, have invented a new and useful Improvement in Tetrazo Dyes, (for which the Farbenfabriken, vormals Fr. Bayer & Co., of Elberfeld, Germany, has already obtained Letters Patent in England, No. 20,579, dated October 31, 1893; in France, No. 233,732, dated October 30, 1893, and in Italy, Reg. Gen., Vol. XXVIII, No. 36,335, Reg. Att., Vol. LXXI, No. 208, dated December 31, 1893;) and I hereby declare the following to be a clear and exact description of my invention.

My invention relates to the production of a new class of tetrazo dye-stuffs by combining one molecule of a tetrazotized paradiamin of the benzidin series (such as benzidin, tolidin, dianisidin) with one molecule of the 1.8 amidonaphthol 4.6 disulfo acid which is described in the German Letters Patent, No. 80,741, dated August 20, 1893, (granted to the Farbenfabriken vormals Friedrich Bayer & Co., of Elberfeld, Germany,) and coupling the intermediate product thus obtained with one molecule of any of the known azo dye-stuff components such as 1.8 amidonaphthol 3.6 disulfo acid, 1.4 naphtholsulfo acid, alpha-naphthylamin or the like.

The dyestuffs thus obtained are alkaline salts of acids having the general formula:

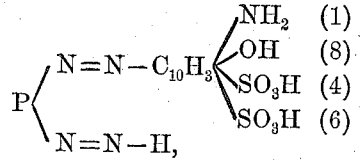

in which formula P means a radical of the benzidin series such as diphenyl, ditolyl, diphenol-ether, H the radical of one of the above mentioned components. The new coloring matters represent dark powders soluble in water. They yield on unmordanted cotton from violet blue to blue and greenish blue shades and can be rediazotized either in solution or when on the fiber and coupled with a suitable component.

In carrying out my invention practically I can proceed as follows (the parts being by weight): 12.2 parts of dianisidin are diazotized in the usual manner by means of 40 parts of hydrochloric acid (19 degrees Baumé) and 7 parts of sodium nitrite. To the resulting icy cold tetrazo solution neutralized by means of sodium carbonate an icy cold weak alkaline solution prepared by dissolving 18.5 parts of 1.8 amidonaphthol 4.6 disulfonate of sodium in 200 parts of water with the addition of sodium carbonate is added with stirring. After the formation of the intermediate product is finished, immediately a cold, weak alkaline solution prepared by dissolving 18.5 parts of 1.8 amidonaphthol 3.6 disulfonate of sodium in 200 parts of water with the addition of sodium carbonate is stirred into the reaction mixture. Stirring is continued for about 12 hours. Subsequently the mixture is heated to 50 degrees centigrade and finally the finished dye-stuff is precipitated by means of common salt, filtered, pressed, dried and pulverized.

It is the sodium salt of an acid having the formula:

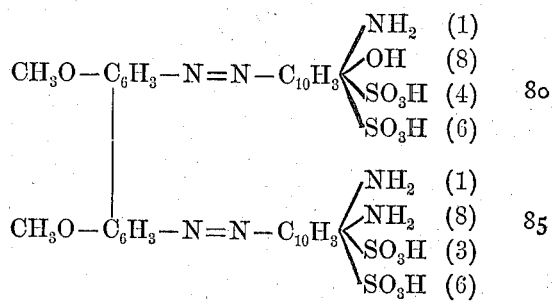

and represents a dark bronzy-colored powder easily soluble in water with a greenish-blue color, soluble in concentrated sulfuric acid with a green color which turns into blue on adding a small quantity of ice while a blue flaky precipitate is obtained on the addition of a larger quantity of ice to the sulfuric acid solution. The coloring matter dyes unmordanted cotton greenish blue shades fast to acids and alkalies. It can be rediazotized either in solution or on fiber and further coupled with a suitable component.

Having now described my invention and in what manner the same is to be performed, what I claim as new, and desire to secure by Letters Patent, is—

1. The process for producing new tetrazo dye-stuffs by combining one molecule of a tetrazotized paradiamin with one molecule of 1.8 amidonaphthol 4.6 disulfo acid and coupling the resulting intermediate product with one molecule of the known dye-stuff components, such as naphthol sulfo acids substantially as described.

2. The process for producing a new tetrazo dyestuff by combining one molecule of the intermediate product from diazotized dianisidin and 1.8 amidonaphthol 4.6 disulfo acid with one molecule of 1.8 amidonaphthol 3.6 disulfo acid, substantially as described.

3. As new articles of manufacture the new tetrazo dye-stuffs being alkaline salts of acids having the general formula:

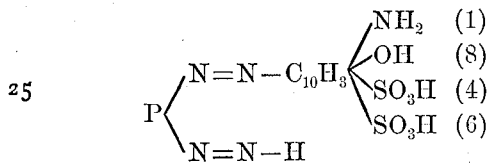

in which formula P means a radical of the benzidin series, such as diphenyl, ditolyl, diphenol ether, H the radical of any of the known dye-stuff components such as naphthol sulfo acids which are dark powders, soluble in water, rediazotizable in solution or when on fiber, dyeing unmordanted cotton from violet to blue and greenish blue shades substantially as described.

4. As a new article of manufacture the specific dye-stuff being an alkaline salt of the acid having the formula

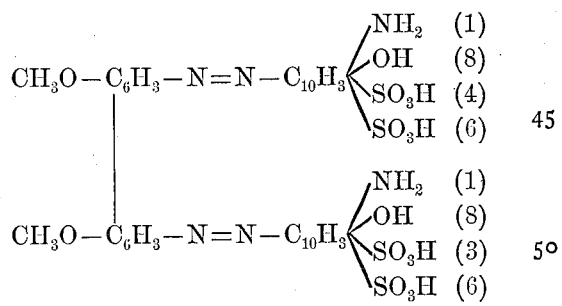

which is a dark bronzy powder, easily soluble in water with a greenish blue color, rediazotizable in solution or when on the fiber, soluble in concentrated sulfuric acid with a green color which turns into blue on adding a small quantity of ice while a blue flaky precipitate is obtained on the addition of a larger quantity of ice to the sulfuric acid solution, dyeing unmordanted cotton greenish blue shades fast to acids and alkalies substantially as described.

In testimony whereof I have signed my name in the presence of two subscribing witnesses.

JOHANN BAMMANN.

Witnesses:
R. E. JAHN,
OTTO KÖNIG.